(12) United States Patent
Chen et al.

(10) Patent No.: US 7,221,115 B2
(45) Date of Patent: May 22, 2007

(54) METHOD AND APPARATUS FOR CONTROLLING MULTIPLEXED MOTORS

(76) Inventors: Jack Chen, 14 Kimberly Cir., Oak Brook, IL (US) 60521; Kenneth Such, 231 Biltmore Dr., North Barrington, IL (US) 60010; Eric Gonzales, 3013 Peachtree Cir., Aurora, IL (US) 60504; Jeremy Waldrop, 1557 Golden Oaks Pkwy., Aurora, IL (US) 60506; Milan Sebek, 4461 Brittany Dr., Lisle, IL (US) 60532

(*) Notice: Subject to any disclaimer, the term of this patent is extended or adjusted under 35 U.S.C. 154(b) by 262 days.

(21) Appl. No.: 10/722,798

(22) Filed: Nov. 26, 2003

(65) Prior Publication Data

US 2005/0110441 A1    May 26, 2005

(51) Int. Cl.
*H02P 5/46* (2006.01)
*H02P 1/54* (2006.01)

(52) U.S. Cl. .................. 318/112; 318/112; 318/3; 318/4; 221/129

(58) Field of Classification Search .............. None
See application file for complete search history.

(56) References Cited

U.S. PATENT DOCUMENTS

| | | | | |
|---|---|---|---|---|
| 4,284,208 A | * | 8/1981 | Levasseur | 221/129 |
| 4,354,613 A | * | 10/1982 | Desai et al. | 377/1 |
| 4,458,187 A | * | 7/1984 | Heiman | 318/490 |
| 4,712,049 A | * | 12/1987 | Houserman | 318/112 |
| RE33,314 E | * | 8/1990 | Cowles | 318/98 |
| 5,153,487 A | * | 10/1992 | Hennig | 318/293 |
| 5,350,985 A | * | 9/1994 | Konrad et al. | 318/370 |
| 5,355,059 A | * | 10/1994 | McMillan | 318/103 |
| 5,712,541 A | * | 1/1998 | Larsson | 318/65 |
| 5,924,081 A | * | 7/1999 | Ostendorf et al. | 705/30 |
| 6,008,597 A | * | 12/1999 | Pardo et al. | 318/3 |
| 6,936,982 B2 | * | 8/2005 | Diesner et al. | 318/34 |

\* cited by examiner

*Primary Examiner*—Lincoln Donovan
*Assistant Examiner*—Renata McCloud
(74) *Attorney, Agent, or Firm*—Robert L. Marsh

(57) ABSTRACT

A control for stopping the rotation of the output shafts of a plurality of multiplexed motors configured in columns and rows with the first connector of each motor in a given column connected in parallel and with the second connector of each motor of a given row of motors connected in parallel. Each motors includes a switch positioned to be actuated when the output shaft of the motor is in its home orientation. One contact of the switch is connected to a first contact of the motor and therefor receives power when the switch for the column is energized. The second connector of each switch in a given row are connected in parallel to a detector for detecting a change in electric potential. The detector will detect a change in potential when the rotating shaft of an energized motor rotates its output shaft to its home position thereby closing its associated switch.

4 Claims, 5 Drawing Sheets

METHOD AND APPARATUS FOR CONTROLLING MULTIPLEXED MOTORS

The present invention relates to controlling electrically multiplexed gear motors in a vending machine and in particular to an improved method of detecting when the gear motors have returned to their home position.

BACKGROUND OF THE INVENTION

Vending machines used to dispensed candy and snack products are adapted to offer a very large selection of products from a single machine. Each of the products being offered is dispensed by a single dispensing device including a spiral shaped coil or auger driven by an electrically operated gear motor. The snack products are positioned linearly between the coils of the auger and the gear motor rotates the augur, usually through a single 360 degree rotation, to dispense a single product. The wiring for the gear motors that drive the various augurs are arranged in rows and columns and a controller applies power through a multiplex circuit to drive the motor for dispensing the product that a customer has selected. Once the customer has selected a product, the controller applies power to the appropriate motor by closing switches to the wires for the correct column and row of the motor operating the auger. The gear motor and augur continue to rotate through a cycle (which may be 360 degrees) after which the augur returns to its home position. A cam on the output shaft of the gear motor operates a switch creating an electric signal to the electronic controller after which the controller terminates power to the gear motor causing it to stop in the home position.

A vending machine for dispensing snack products and candy may have fifty or more independently operated gear motors for dispensing products. The electronics for the vending machine therefore must include a sensor for sensing when the shafts for each of the fifty or more rotatable shafts has reached its respective home position. Although the metal parts of a vending machine are useable for a ground, existing vending machines employ at least one wire directed to each of the gear motors to provide the needed feedback to the controller for terminating power to the gear motors after they have completed rotation through 360 a cycle. It should be appreciated that most products are dispensed with the gear motor rotating through a 360 degree cycle, but some products may require less than a full rotation and other products may require more than full rotation of the shaft. Where the machine employs a large number of gear motors, the wire harness complexity increases. It would be desirable, therefore, to provide an improved method of controlling the gear motors of a vending machine such that each gear motor of the machine will provide a signal to the controller when the associated rotatable shaft has returned to its home position, without requiring a wire attached to each of the individual motors.

SUMMARY OF THE INVENTION

Briefly, the present invention is embodied in a control for a vending machine of the type having a plurality of gear motors each of which must rotate an output shaft through 360 degrees to dispense a product. In the preferred embodiment, the vending machine has a plurality of vertically stacked trays, with each of the trays having six to ten gear motors and their associate augurs aligned in side by side fashion. The gear motors of each tray therefore form a row of a multiplexed circuit having columns and rows. Each of the motors has a first and second contact, with the second contact of each of the motors in a tray connected in parallel. The trays are stacked one above another in the machine, and the gear motors of the stacked trays are electronically configured in columns with the first contact of each of the motors of a column also connected in parallel. Electrical power to each of the columns and to each of the rows are independently switched open or closed by the controller, such that a selected motor can be energized by closing the switches for both the column and row of the selected gear motor. Such multiplexing circuits are well known in the art.

In accordance with the invention, each of the gear motors has associated therewith an electric switch which is activated by a cam connected to the output shaft of the gear motor such that the switch is activated when the shaft has returned to the home position. The switch for each of the gear motors has a first contact that is electrically connected to the first contact of the associated gear motor. The second contacts for all of the gear motors in a single tray are connected in parallel and are connected to a detector circuit within an electronic controller for detecting a change in the electric potential at the common connection of the second contacts of the row of gear motors.

A tray of a vending machine configured in accordance with the present invention has an electrical connector for each of the first contacts of the gear motors and a single connector for the second contacts of the gear motor, since all second contacts are connected in parallel, and a common connector for the second pole of the switches of the gear motors of the tray.

In the preferred embodiment, the circuit includes a semiconductor element, such as a diode, to prevent reverse flow of current through the switch associated with each of the gear motors during the operation of one of the gear motors. The switches are configured to change state when the cam on the output shaft is in the home position. When power is applied to one of the selected gear motors, the energized motor will commence the rotation of the shaft and move the cam away from the switch, changing the state of the switch. Electric current will therefore pass through the line connecting the column of gear motors and will be applied to the coils of the selected motor. Once the motor has rotated the shaft and cam through 360 degrees, the cam will again change the state of the associated switch connecting the first pole of the motor to the detector line and thereby changing the potential between the detector line and ground. The controller that directs power to the gear motor responds to the detection of a change in potential in the detector line and terminates power to the two poles of the gear motor by opening the switch to the appropriate column and row and stopping the gear motor with the cam in its home position.

BRIEF DESCRIPTION OF THE DRAWINGS

A better understanding of the invention will be had after a reading of the following detailed description taken in conjunction with the drawings, wherein.

DETAILED DESCRIPTION OF THE PREFERRED EMBODIMENT

Figure 2:
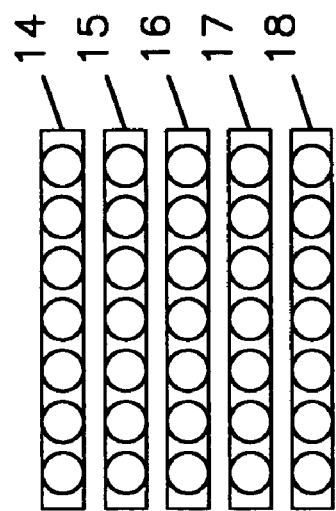
FIG. 2 is a front view of the configuration of the trays and dispensing coils of the vending machine shown in FIG. 1.
Figure 1:
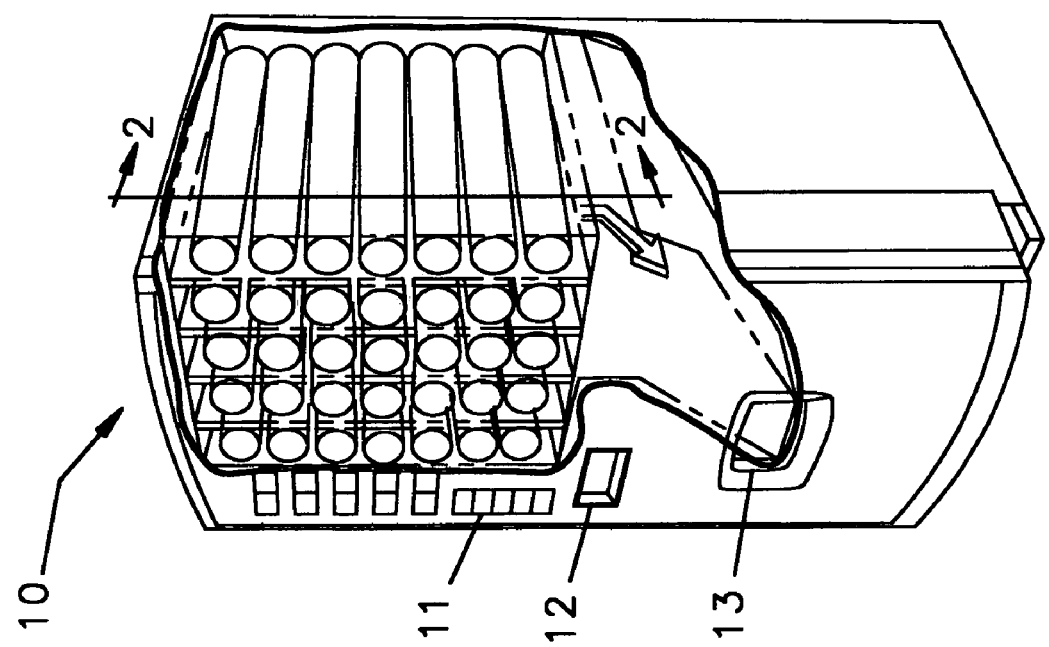
FIG. 1 is an isometric view, partially broken away, of a vending machine embodying the invention.
Figure 3:
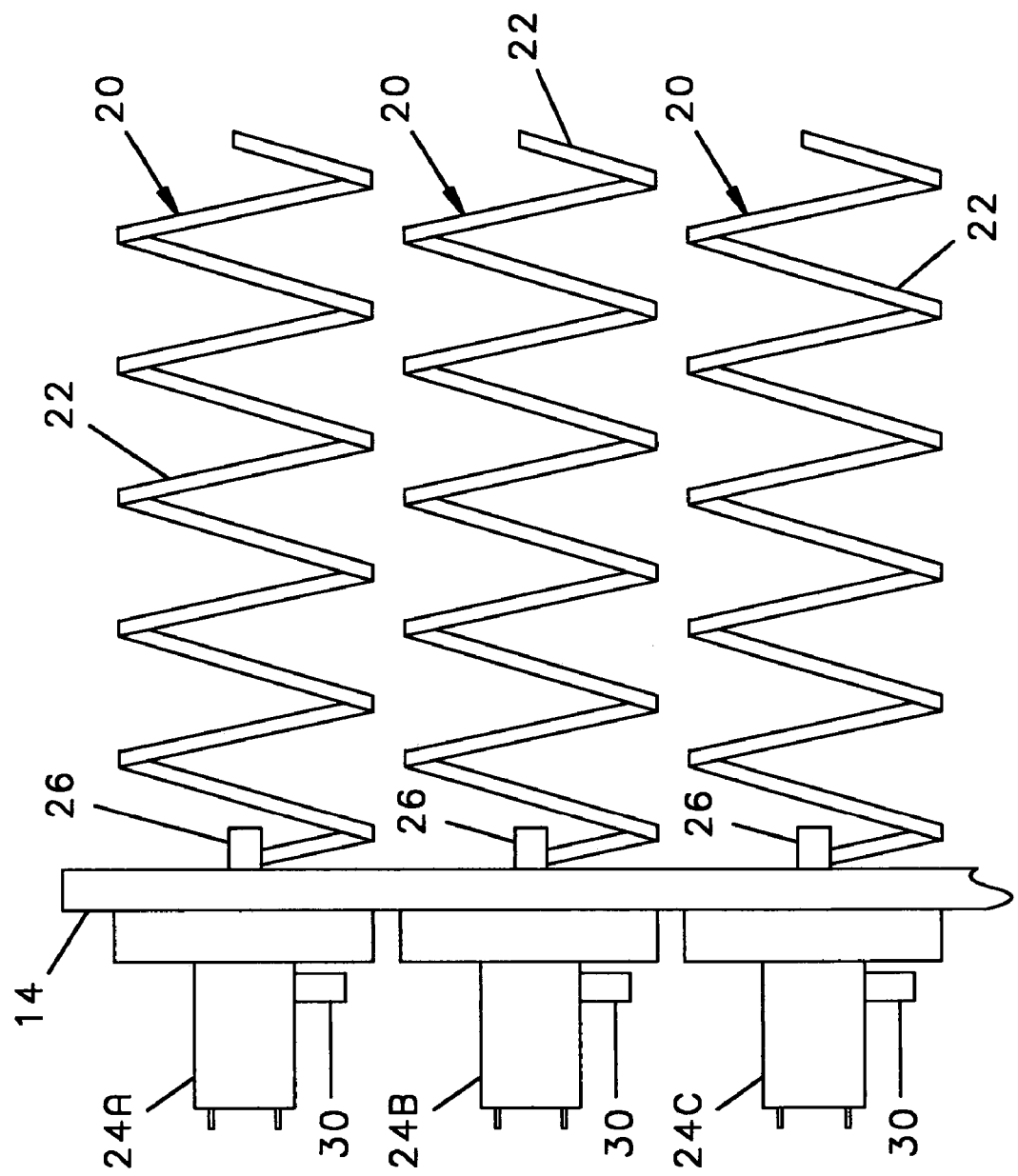
FIG. 3 is a fragmentary, top elevational view of one of the trays shown in FIG. 2, consisting of a plurality of parallel oriented gear motors and dispensing coils.
Figure 4:
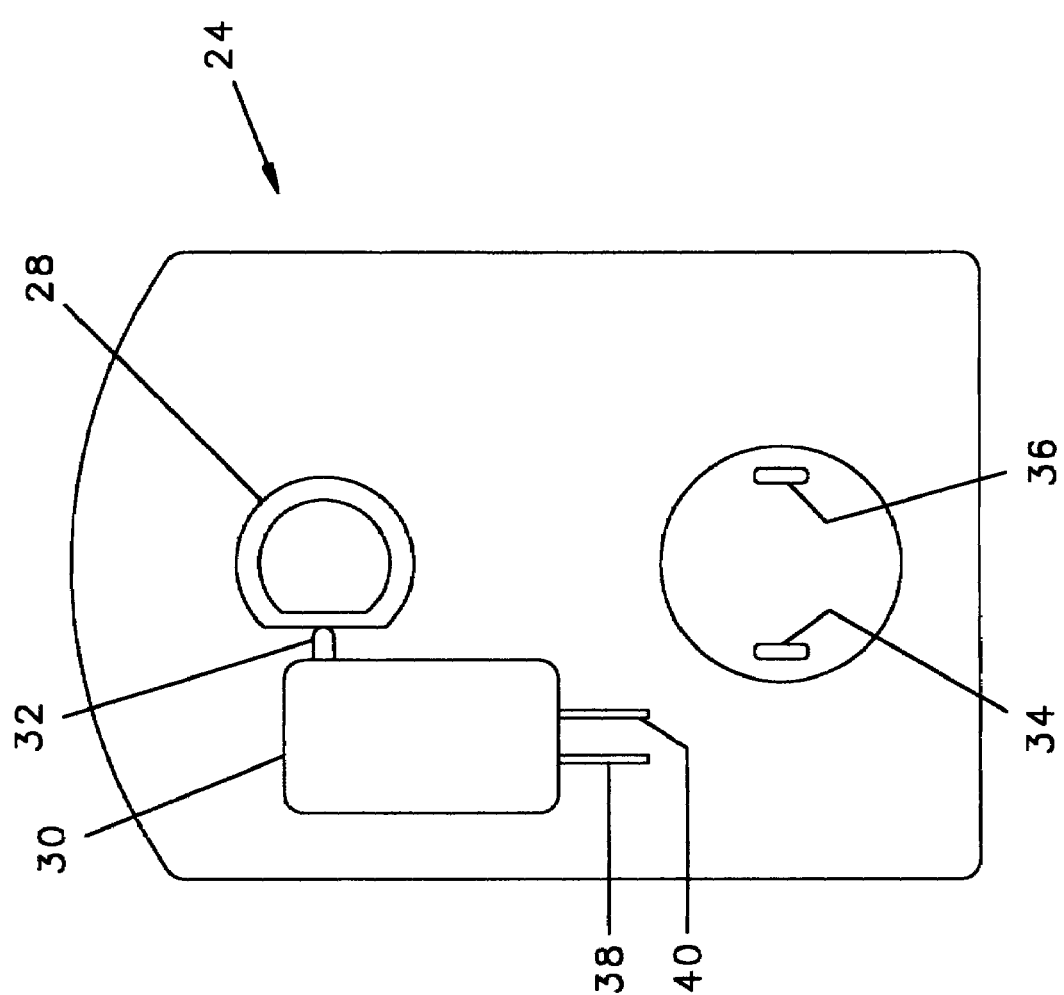
FIG. 4 is a rear view of a gear motor showing the associated cam and controlling switch.

Referring to FIGS. 1 through 4, a vending machine 10 includes a selection panel 11, a money reception 12, and a dispensing tray 13 for dispensing a product to a customer. The machine 10 also has a plurality of trays 14, 15, 16, 17, 18 for dispensing products. Along each of the trays 12–18, of which tray 14, a fragment of which is depicted in FIG. 3. is typical of each, are a plurality of dispensing augurs 20—20. Each of the dispensing augurs 20 includes a spiral coil 22 driven by a gear motor 24 having an output shaft 26. As best shown in FIG. 4, on the rearward end of the output shaft 26 is a cam 28 and adjacent cam 28 is an electric switch 30 having an actuator 32. As depicted in FIG. 4, the switch 30 is actuated when the cam 28 engages the actuator 32.

Figure 5:
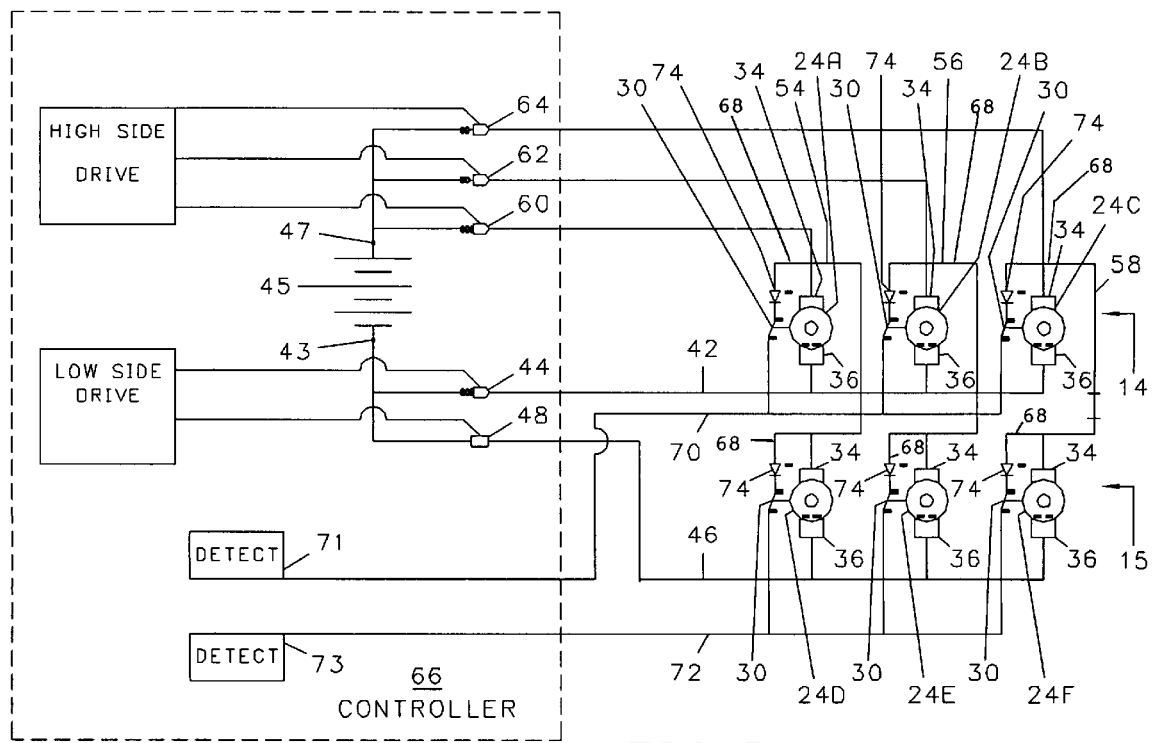
FIG. 5 is a schematic view of the detecting circuit for six of the gear motors of the vending machine shown in FIG. 1; and, FIG. 6 is a fragmentary enlargement of FIG. 5 showing a single gear motor.

The motors 24 are electrically operated, and therefore have first and second electrical contacts 34, 36 respectively for applying an electric potential across the coils thereof. In FIG. 5, the first contacts for the last three motors 24d, 24e, and 24f are not marked with the indicia number 34, but the first contact of these three motors is in the same relative position as those marked 34 in the first motors 24a, 24b, and 24c and the last three motors will be described as having first contacts 34 even though these indicia numbers are not marked. Each motor 24 also has first and second contact 38, 40 for the associated electric switch 30.

For simplicity, FIG. 5 depicts a circuit having only six dispensing elements for which there are six gear motors numbered 24a, 24b, 24c, 24d, 24e, and 24f. Gear motors 24a, 24b, and 24c are configured in the first tray 14 and gear motors 24d, 24e, and 24f are configured in the second tray 15.

Referring to FIGS. 1, 4, 5 and 6, the second contact 36 of the gear motors 24a, 24b, 24c of tray 14 are connected in parallel by common connecting wire 42 to a switch 44 for connecting and disconnecting the common connector and the second contacts 36 to a first pole 43 of an electric power source 45. In similar fashion, the second contacts 36 of the gear motors 24d, 24e, and 24f of tray 15 are connected in parallel by common connector line 46 to a switch 48 for connecting and disconnecting power to the first pole 43 of the source 45 of electric power.

The first contact 34 of the various electric motors 24 are also connected in columns. Specifically, the first contacts 34 of gear motors 24a and 24d are connected in parallel by a common connector line 54, the first contacts 34 of gear motors 24b and 24e are connected in parallel by common connector line 56, and the first contacts 34 of gear motors 24c and 24f are connected in parallel by common connector line 58.

In accordance with current technology the gear motors 24a–24f are powered by an electronic controller 66 having internally all functions needed to operate the motors. Accordingly, common connector line 54 is connected through a switch 60 provided within the controller 66 for connecting and disconnecting the contacts 34 of gear motors 24a and 24d to the second pole 47 (in this case the high side) of the source 45 of electric power. In similar fashion, common connector line 56 is connected through a second switch 62 within controller 66 for connecting and discon-necting the first contacts 34 of gear motors 24b and 24e to the second pole 47 (the high side) of a source of electric power 45, and common connector line 58 is connected through a third switch 64 for connecting and disconnecting contacts 34 of gear motors 24c and 24f to the second pole (high side) of the source of electric power 45. In the preferred embodiment the switches 44, 48, 60, 62, 64 are actuated within the controller 66 and the power supply 45 is built into the controller 66 although it should be appreciated that all the switches 44, 48, 60, 62, 64 could be operated from outside the controller 66 and the power supply 45 could also be external of the controller 66.

The circuit consisting of the connecting lines 42, 46, 54, 56, and 58 and the various switches 44, 48, 60, 62, and 64 provide for the multiplexing of the motors 24a–24f. The controller 66 will close the switch 44, 48 for the appropriate tray or row 14, 15 and the switch 60, 62, 64 for the appropriate column, and power 45 will be applied to the one gear motor 24 associated with the product selected by a customer for dispensing. Once the controller 66 has directed power through the appropriate switches to the selected gear motor 24, the gear motor 24 will commence rotating its associated output shaft 26 and will continue rotating the shaft 26 until a signal is received indicating that the rotating output shaft 26 has returned to its home position, after which the controller 66 will open the associated switches 44, 48, 60, 62, 64 and terminate power to the operating gear motor 24 as is further described below.

Figure 6:
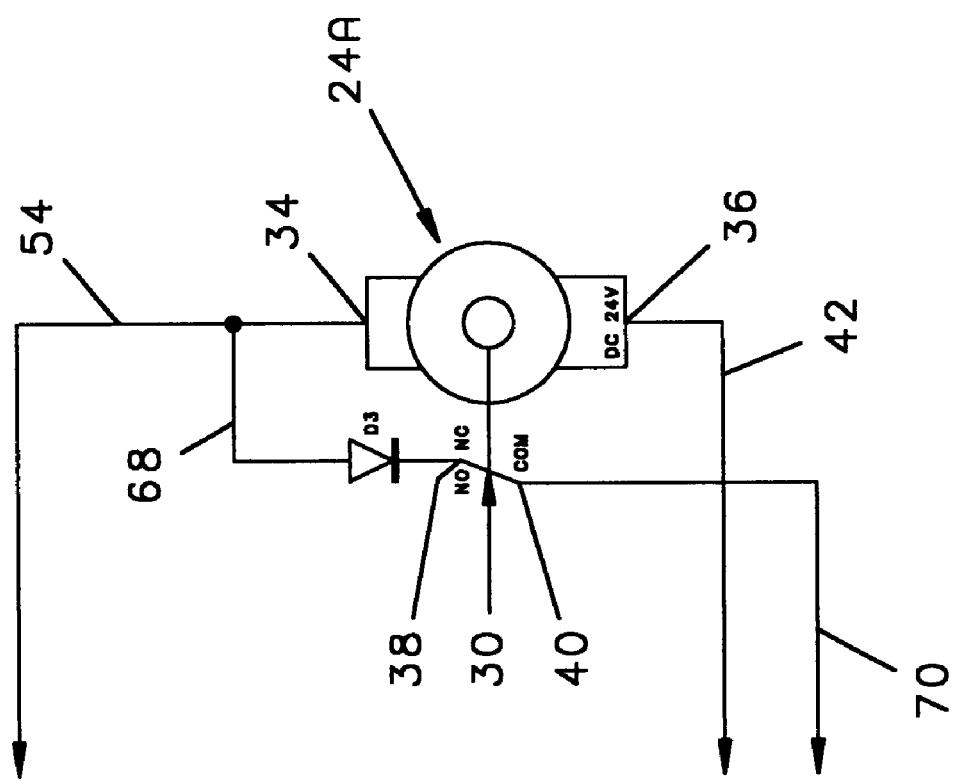

Referring to FIGS. 4, 5 and 6, in accordance with the invention the first contact 38 of the switch 30 associated with each gear motor 24 is electrically connected by connector 68 to the first contact 34 of the associated gear motor 24. Also, the second contacts 40 of the switches 30 of all the gear motors 24a, 24b, 24c of the first row identified as tray 14 are connected in parallel by a common connector line 70 to a detector 71, which is built into the controller 66, for detecting a change in the electric potential in line 70. The controller 66 will terminate power to the energized motor 24 in row 14 when a change in electric potential is detected by the detector 71 as is further described below. In similar fashion, the second contacts 40 of the switches 30 of gear motors 24d, 24e, 24f of the second row, identified as tray 15, are connected in parallel through common connector line 72 to a second detector 73 in controller 66 for detecting a change in the electric potential in line 72. The controller 66 will terminate power to an energized motor in row 15 when a change in the electric potential in line 72 is detected as is further described below.

A semi-conductor 74, such as a diode, in the circuit of the switch 30 prevents the leakage of electric power from an energized gear motor to other gear motors mounted on the same tray as the gear motor being energized. It should be appreciated that the polarity of the semi-conductor 74 must be reversed if the polarity of the power source 45 is reversed.

When power is applied to one of the gear motors, for example gear motor 24a, by opening switches 44 and 60 electrical power from source 45 is applied across the contacts 34 and 36 of gear motor 24a energizing the gear motor 24a. Rotation of the gear motor 24a causes the output shaft 26 to move the flat of the cam 28 off actuator 32 thereby opening the associated switch 30. With the switch 30 open, there is no electrical connection between pole 47 of the electrical power source 45 and line 70. The switch 30 remains open until the gear motor 24a has completed a cycle (which typically is 360 degrees but may be greater or less than 360 degrees) and the cam 28 again engages the actuator 32 and closes the switch 30. When the switch 30 is again closed, contact pole 47 of the source of electrical power 45 is connected to detector line 70 changing the electric potential in line 70. When the controller 66 detects a change in the potential of line 70 it will open the switch 44 to the tray 14 and switch 60 the first column thereby terminating power to the gear motor 24a.

As can be seen, the controller of the present invention does not require a separate connector wire to each of the six motors depicted in order to detect that the operating gear motor has completed a 360 degree cycle. In the depicted embodiment, with two trays of three gear motors each, only two detector wires, 70, 72 are needed to monitor all six of the gear motors 24a–24f. Accordingly, fewer wires are needed to monitor the operation of the various gear motors of a vending machine 10, thereby simplifying the manufacture of the machine and reducing the amount of time required to install the electrical connections.

It should also be appreciated that while the second contacts 40 of the switches 30 have been described as being connected in parallel to detectors 71, 73 for the respective rows 14, 15 and the first connectors of the switches 30 have been described as being connected to pole 47 of the source 45 of electric power the structure could be reversed. In that case the second contacts 40 of switches 30 would be connected in parallel and to a detector for detecting a change in potential and the first contacts 38 of the switches 30 would be connected to pole 43 of the source 45 of electric power. The use of the terms "column" and "row" are interchangeable because the circuit is not dependent upon vertical and horizontal orientations but upon the existence of a grid of multiplex of motors.

While the present invention has been depicted with respect to a single embodiment, it will be appreciated that many modifications and variations may be made without departing from the true spirit and scope of the invention. It is therefore the intent of the appendant claims to cover all such variations and modifications which fall within the true spirit and scope of the invention.

What is claimed:

1. The method of controlling a plurality of motors for stopping said motors at a home orientation wherein each of said motors has a first contact, a second contact, and an output shaft, said plurality of motors being configured in a grid having columns and rows with said first contacts of all of said motors in one of said column connected in parallel by a first wire to a first pole of a surface of electric power through a first switch and said second contacts of all of said motors in one of said row connected in parallel by a second wire to a second pole of said source of electric power through a second switch wherein one of said plurality of motors in a first column and in a first row is energized by closing said first switch of said first column and said second switch of said first row to direct electric power across said first contacts of said first column and across said second contacts of said first row, said method comprising the steps of:

providing a switch on each of said plurality of motors wherein said switch has a first contact, a second contact, an open position, and a closed position, providing means on said output shaft of each of said plurality of motors for actuating said switch thereon when said shaft is at said home orientation, connecting said first contact of said switch to said first contact of said motors for each of said plurality of said motors, providing means for detecting a change in electric potential, connecting said second contact of said switches of each of said plurality of motors of said first row in parallel by a third wire to said means for detecting a change in electric potential wherein said means for detecting will detect a change in potential when said shaft of said one of said plurality of motors rotates to its said home orientation, and opening said first switch of said first column and said second switch of said first row when said detector detects said change in potential to stop further rotation of said one of said plurality of motors.

2. The method of claim 1 and comprising the further step of providing means in series with said switch for preventing a reverse current through said switch.

3. In a control for controlling a plurality of motors for stopping said motors at a home orientation wherein each of said motors has a first contact, a second contact, and an output shaft, said plurality of motors being configured in a grid having columns and rows with said first contacts of all of said motors in a first of said columns connected in parallel by a first wire through a first switch to a first pole of a source of electric power and said second contacts of all of said motors in a first of said rows connected in parallel by a second wire through a second switch to a second pole of said source of electric power, wherein said control applies electric power to one of said plurality of motors in a said first column and in said first row by closing said first and second switches and directing electric power across said first contacts of said first column and said second contacts of said first row, a switch on each of said plurality motors, said switch on each of said plurality of motors having a first contact, a second contact, an open condition and a closed condition, and for each of said plurality of motors means of said output shaft thereof for actuating said switch thereon when its said shaft is in its said home orientation, the improvement in said control comprising:

for each one of said plurality of motors, said first contact of said switch thereon connected to said first contact of said motor, means for detecting a change in electric potential, for each one of said plurality of motors in said first row of motors said second contact of said switch thereon connected in parallel to said means for detecting a change in electric potential by a third wire, wherein said means for detecting will detect a change in potential when said first and second switches are closed and said output shaft of said one of said plurality of motors has rotated to its said home orientation, and said controller terminates further rotation of said one of said plurality of motors by opening said first switch and said second switch when said means for detecting detects said change in potential.

4. The improvement of claim 3 and further comprising means in series with said switch on each of said plurality of motors for preventing a reverse current through said switch thereon.

* * * * *

UNITED STATES PATENT AND TRADEMARK OFFICE
CERTIFICATE OF CORRECTION

PATENT NO. : 7,221,115 B2  Page 1 of 1
APPLICATION NO. : 10/722798
DATED : May 22, 2007
INVENTOR(S) : Jack Chen et al.

It is certified that error appears in the above-identified patent and that said Letters Patent is hereby corrected as shown below:

In column 5, line 5, after "switch 60" insert --in--

In column 5, line 44, after "first" delete "contacts" and substitute --contact--

In column 5, line 45, after "said" second occurrence, delete "column" and substitute --columns--

In column 5, line 46, after "of a" delete "surface" and substitute --source--

In column 5, line 47, after "second" delete "contacts" and substitute --contact--

In column 5, line 48, after "said" delete "row" and substitute --rows--

In column 6, line 23, after "first" delete "contacts" and substitute --contact--

Signed and Sealed this

Seventh Day of April, 2009

JOHN DOLL
*Acting Director of the United States Patent and Trademark Office*